US009624385B2

(12) United States Patent
Waku

(10) Patent No.: US 9,624,385 B2
(45) Date of Patent: Apr. 18, 2017

(54) ANTIFOULING PAINT COMPOSITION, COPOLYMER FOR ANTIFOULING PAINT COMPOSITION AND METHOD FOR MANUFACTURING SAME, AND PAINTED OBJECT HAVING ON SURFACE ANTIFOULING PAINT FILM FORMED USING SAID COMPOSITION

(71) Applicant: NITTO KASEI CO., LTD., Osaka-shi, Osaka (JP)

(72) Inventor: Hidenori Waku, Osaka (JP)

(73) Assignee: Nitto Kasei Co., Ltd., Osaka (JP)

( * ) Notice: Subject to any disclaimer, the term of this patent is extended or adjusted under 35 U.S.C. 154(b) by 0 days.

(21) Appl. No.: 14/786,133

(22) PCT Filed: Apr. 16, 2014

(86) PCT No.: PCT/JP2014/060831
§ 371 (c)(1),
(2) Date: Oct. 21, 2015

(87) PCT Pub. No.: WO2014/175140
PCT Pub. Date: Oct. 30, 2014

(65) Prior Publication Data
US 2016/0068688 A1 Mar. 10, 2016

(30) Foreign Application Priority Data
Apr. 24, 2013 (JP) .................................. 2013-091623

(51) Int. Cl.
*C08F 230/08* (2006.01)
*C09D 5/16* (2006.01)
(Continued)

(52) U.S. Cl.
CPC .............. *C09D 5/16* (2013.01); *C08F 230/08* (2013.01); *C09D 7/12* (2013.01); *C09D 133/14* (2013.01); *C09D 143/04* (2013.01); *C09J 133/06* (2013.01)

(58) Field of Classification Search
None
See application file for complete search history.

(56) References Cited

U.S. PATENT DOCUMENTS 5,436,284 A      7/1995  Honda
9,139,741 B2 *   9/2015  Iwamoto ............... C08F 220/06
(Continued)

FOREIGN PATENT DOCUMENTS

JP       7-102193 A       4/1995
JP      10-030071 A       2/1998
(Continued)

OTHER PUBLICATIONS

International Search Report mailed Jul. 22, 2014, issued in corresponding International Application No. PCT/JP2014/060831, filed Apr. 16, 2014, 2 pages.

*Primary Examiner* — Peter A Salamon
(74) *Attorney, Agent, or Firm* — Christensen O'Connor Johnson Kindness PLLC

(57) ABSTRACT

The purpose of the present invention is to provide a copolymer allowing for an antifouling coating composition used for the formation of an environment-friendly antifouling coating film. The antifouling coating composition gives the coating film increased water resistance and can maintain the stable dissolution property and antifouling performance of the coating film without causing coating film defects such as a crack during long-term seawater treatment. An aspect of the present invention provides a copolymer for an antifouling coating composition, including a copolymer (A) having, on a side chain, a group represented by chemical formula (1)
(Continued)

and having, on terminal, at least one of a group represented by chemical formula (2) and a group represented by chemical formula (3).

7 Claims, 2 Drawing Sheets

(51) Int. Cl.
    *C09D 7/12*       (2006.01)
    *C09D 143/04*    (2006.01)
    *C09J 133/06*    (2006.01)
    *C09D 133/14*   (2006.01)

(56) References Cited

U.S. PATENT DOCUMENTS

2003/0225184 A1* 12/2003 Aubart ................ C09D 5/1668 523/122
2004/0138332 A1* 7/2004 Aubart ................ C09D 5/1668 523/122
2004/0236130 A1* 11/2004 Plehiers ................ C07F 7/0834 556/428
2004/0255980 A1 12/2004 Bruce
2005/0123503 A1* 6/2005 Kozasa ................ C09D 5/1612 424/78.09
2011/0166253 A1* 7/2011 Mori ..................... C09D 5/1618 523/122
2011/0172325 A1* 7/2011 Mori ..................... C09D 5/1612 523/122
2013/0245179 A1 9/2013 Iwamoto

FOREIGN PATENT DOCUMENTS

| | | |
|---|---|---|
| JP | 2001-096248 A | 4/2001 |
| JP | 3941027 B2 | 4/2007 |
| JP | 2010-144106 A | 7/2010 |
| JP | 2012-5952 A | 1/2012 |
| WO | 2009/001619 A1 | 12/2008 |
| WO | 2012/026237 A1 | 3/2012 |
| WO | 2012/070552 A1 | 5/2012 |

* cited by examiner

ANTIFOULING PAINT COMPOSITION, COPOLYMER FOR ANTIFOULING PAINT COMPOSITION AND METHOD FOR MANUFACTURING SAME, AND PAINTED OBJECT HAVING ON SURFACE ANTIFOULING PAINT FILM FORMED USING SAID COMPOSITION

TECHNICAL FIELD

The present invention relates to an antifouling coating composition, a copolymer for the antifouling coating composition and a method for producing the composition and/or the copolymer, and a coated object having, on its surface, an antifouling coating film formed using the composition.

BACKGROUND ART

Aquatic fouling organisms such as barnacles, tubeworms, common mussels, *Bugula neritina*, sea squirts, green laver, sea lettuce, and slimes attach to ships (especially ship bottoms), fishing tools such as fishing nets and fishing net accessories, and structures submerged in seawater such as power plant aqueducts, leading to dysfunction, impaired appearance, and other problems of the ships and so on.

Since a conventional organic tin-containing copolymer has been banned, triorganosilyl group-containing copolymers which have low toxicity and are environment-friendly have been developed and have been used for antifouling coating compositions (Patent Literature 1).

These copolymers can be typically produced by polymerization using a general-purpose polymerization initiator such as t-butylperoxy-2-ethyl hexanoate or AIBN, etc. The copolymers having an weight-average molecular weight (Mw) of 10,000 to 100,000 have been frequently used.

The triorganosilyl ester copolymer produced by polymerization using the above general-purpose polymerization initiator may be used for an antifouling coating composition. In this case, an antifouling coating film formed using the antifouling coating composition dissolves in seawater at a constant rate during the initial stage. However, the dissolving rate of the coating film gradually increases. After a long period has passed, the dissolving rate of the coating film becomes too large. Unfortunately, it is thus difficult to design a coating material. Because of the above, disclosed is an antifouling coating material that exerts the long-term stable dissolution property of the coating film by using rosin, a rosin derivative, or a metal salt thereof in addition to the triorganosilyl ester-containing copolymer (Patent Literature 2).

Although the antifouling coating material can exert the long-term stable dissolution property of the coating film, coating film defects such as a crack occur in the coating film after long-term soaking in seawater. This problem is evident when the low-molecular-weight copolymer, in particular, is used.

So far, a solution containing the copolymer used for the antifouling coating composition has been generally produced using a batch reaction apparatus equipped with a stainless-steel reaction tank, an outer jacket, an internal coil, a condenser, a mixer etc. In this batch reaction apparatus, the temperature is controlled by a coolant that flows through the outer jacket and the internal coil. When the production of the copolymer is continuously repeated, a copolymer-derived gel material insoluble in a solvent attaches to and accumulates in the inside of the reaction tank. Because of this problem, when the copolymer is produced, it takes an extra effort and time to wash the inside of the reaction tank. Consequently, there exists a big problem in the aspect of productivity. Further, it has been difficult to control heat generation during polymerization because the gel material attached to the internal coil causes a decrease in the cooling capacity.

As a method for washing away the copolymer-derived gel material attached, disclosed is a method for washing a batch reaction apparatus by using a high-pressure, highly concentrated alkali (15 to 30% by weight) solution (Patent Literature 3). However, because the highly concentrated alkali is made to contact a stainless-steel reaction tank under high-temperature and high-pressure conditions, the reaction tank is corroded and metal atoms are mixed in a copolymer solution, and thus the copolymer solution is colored. In addition, there is such a problem that because the reaction tank is subjected to successive washing, the reaction tank is damaged and its service life is shortened.

Also, as a method for washing away a gel material derived from a thermoplastic acryl copolymer, disclosed is a method for washing a stainless-steel reaction tank by using a aqueous washing solution containing an alkali metal hydroxide (from 1 to less than 15% by weight) and at least one monohydric alcohol (from 3 to 50% or less by weight; the number of carbons is 2 or 3) (Patent Literature 4). This method, however, is performed under mild conditions such as normal pressure and is yet to provide a complete solution to the problems. Besides, a work step of washing away the gel material is still needed. Consequently, this method does not lead to an increase in the productivity of the copolymer.

Further, as for a method of suppressing generation of a gel material itself, disclosed is a batch reaction apparatus having an external circulation cooler (Patent Literature 5). Although the gel material is not generated on, for example, an internal coil in a reaction tank, the gel material is generated in the external circulation cooler. Consequently, washing work is still needed. This method also does not lead to an increase in the productivity of the copolymer.

As described above, unfortunately, the copolymer produced by polymerization using a commonly used polymerization initiator such as t-butylperoxy-2-ethyl hexanoate or AIBN gives a coating film poor properties such as coating film defects (e.g., cracks) in seawater after a given period of soaking in seawater. In addition, due to the poor coating film properties, the long-term stable dissolution property and antifouling performance of the coating film cannot be maintained. Moreover, there exists another manufacturing problem such as poor productivity caused by the generation of the gel material.

CITATION LIST

Patent Literature

Patent Literature 1: JP-A-Hei 7-102193
Patent Literature 2: JP-A-Hei 10-30071
Patent Literature 3: JP-A-2001-96248
Patent Literature 4: JP-A-2012-5952
Patent Literature 5: JP-B-3941027

SUMMARY OF INVENTION

Technical Problem

The purpose of the present invention is to provide a copolymer allowing for an antifouling coating composition used for the formation of an environment-friendly antifouling coating film. The antifouling coating composition gives the coating film increased water resistance and can maintain the stable dissolution property and antifouling performance of the coating film without causing coating film defects such as a crack during long-term usage in seawater. In addition, another purpose of the present invention is to provide an efficient method for producing the copolymer.

Solution to Problem

An aspect of the present invention provides a copolymer for an antifouling coating composition, comprising a copolymer (A) having, on a side chain, a group represented by chemical formula (1) and having, on terminal, at least one of a group represented by chemical formula (2) and a group represented by chemical formula (3). The chemical formulas (1) to (3) are described later.

The present inventor has addressed the problems of developing an antifouling coating composition that can maintain the stable dissolution property and antifouling performance of a coating film without causing coating film defects such as a crack during long-term usage in seawater. The present inventor examined various matters and discovered that use of the above copolymer allowed for significantly better water resistance of the clear coating film. In addition, with regard to the antifouling coating composition using the copolymer, not only the initial (a stage before soaking in seawater) strength of the coating film increased, but also no coating film defects (e.g., a crack) occurred in the antifouling coating film after soaking in seawater for a given period. These surprising results were obtained.

More surprisingly, no gel material was generated in, for example, a reaction tank during the manufacture of the above copolymer (A). This makes it possible to efficiently produce the copolymer (A) without a washing step.

Advantageous Effects of Invention

The present invention provides a copolymer allowing for an antifouling coating composition used for the formation of an environment-friendly antifouling coating film. The antifouling coating composition gives the coating film increased water resistance and can maintain the stable dissolution property and antifouling performance of the coating film without causing coating film defects such as a crack during long-term usage in seawater. Besides, no gel material was generated in, for example, a reaction tank. Collectively, an efficient method for producing the copolymer is provided.

BRIEF DESCRIPTION OF DRAWINGS

FIG. 1(a) shows a spectrum with respect to the "$^{13}$C-DEPT135".

DESCRIPTION OF EMBODIMENTS

Figure 1:
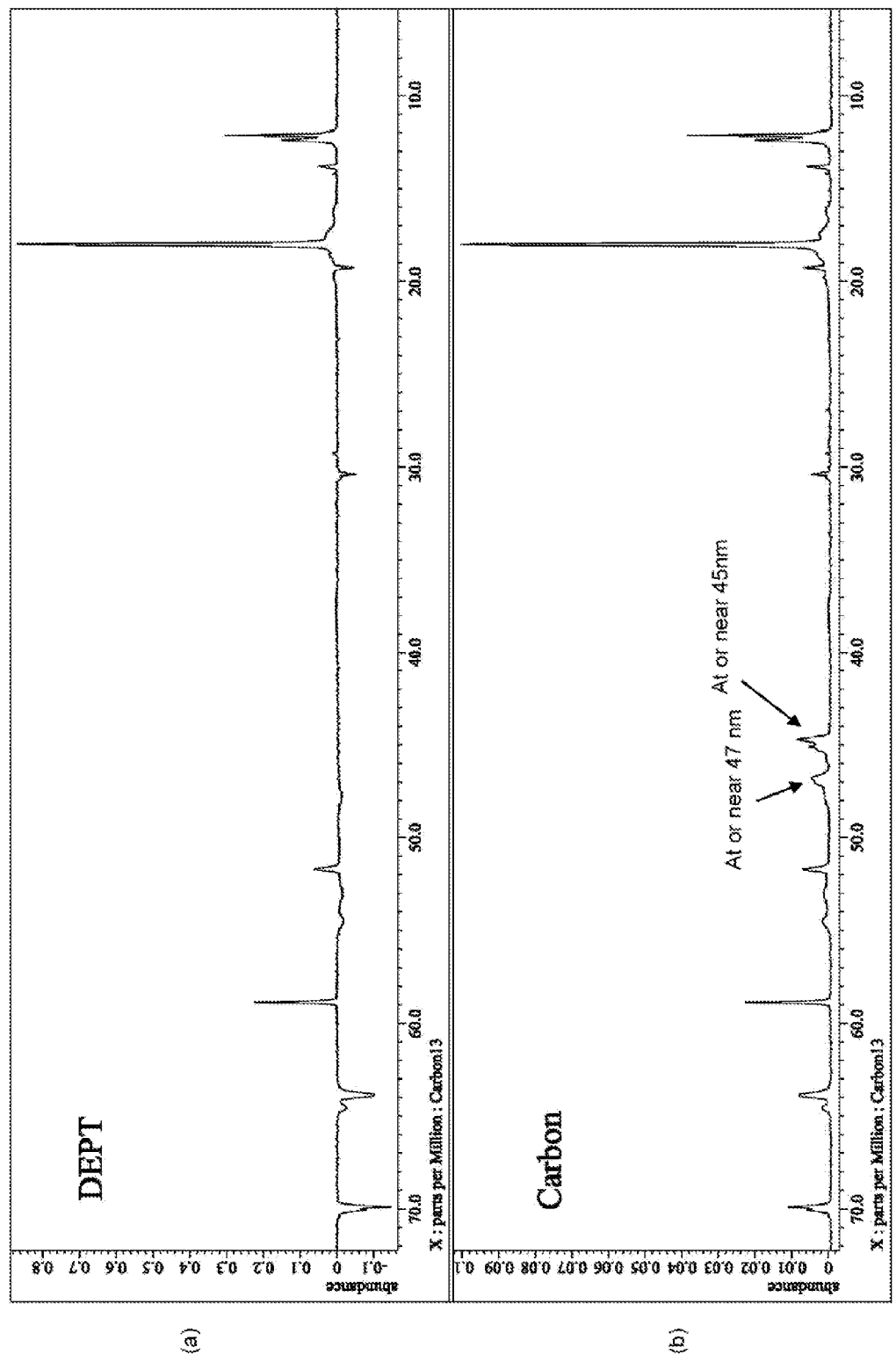
FIGS. 1(a) and (b) each show an NMR spectrum obtained with regard to a copolymer of Production Example 1.
FIG. 1(b) shows a spectrum with respect to the "$^{13}$C-Single pulse with $^1$H decoupling".

Hereinafter, the present invention will be explained in detail.
<Copolymer (A)>

A copolymer (A) according to the present invention has, on a side chain, a group represented by chemical formula (1) and having, on terminal, at least one of a group represented by chemical formula (2) and a group represented by chemical formula (3). The copolymer (A) preferably has, on terminal, both of the group represented by chemical formula (2) and the group represented by chemical formula (3), but may have, on terminal, either one of them.

Chemical Formula (1)

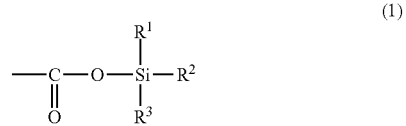

(wherein $R^1$, $R^2$, and $R^3$ are the same or different from each other and each represents a $C_{3-6}$ alkyl group branched at an α-position or a phenyl group).

Chemical Formula (2)

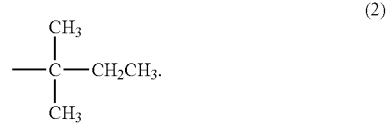

Chemical Formula (3)

Examples of the $C_{3-6}$ alkyl group branched at the α-position include an isopropyl group, s-butyl group, t-butyl group, 1-ethylpropyl group, 1-methylbutyl group, 1-methylpentyl group, 1,1-dimethylpropyl group, 1,1-dimethylbutyl group, and thexyl group.

In particular, the invention enables formation of an antifouling coating film which is unlikely to cause coating film defects and is excellent in water resistance by selecting specific groups for $R^1$, $R^2$, and $R^3$. From such a viewpoint, $R^1$, $R^2$, and $R^3$ are the same or different from each other, and are each preferably an isopropyl group, s-butyl group, t-butyl group, or phenyl group and more preferably an isopropyl group.
<<Synthesis of Copolymer (A)>>

The copolymer (A), for example, can be produced by polymerizing a mixture of the below-described monomer (a) and monomer (b) using a polymerization initiator 1,1,3,3-tetramethyl butylperoxy-2-ethyl hexanoate or 1,1,3,3-tetramethyl butylperoxy neodecanoate. The molecular weight of the copolymer A can be adjusted by suitably selecting the amount of the polymerization initiator used. If necessary, a chain transfer agent, etc., can be used.
<<Monomer (a)>>

The monomer (a) is an ethylenically unsaturated monomer (a) having a group represented by the above chemical formula (1).

Examples of the monomer (a) include triisopropylsilyl (meth)acrylate, tri-s-butylsilyl(meth)acrylate, triphenylsilyl (meth)acrylate, diisopropyl s-butylsilyl(meth)acrylate, diisopropyl t-butylsilyl(meth)acrylate, diisopropyl thexylsilyl(meth)acrylate, diisopropyl phenylsilyl(meth)acrylate, isopropyl di-s-butylsilyl(meth)acrylate, isopropyl diphenylsilyl(meth)acrylate, diphenyl thexylsilyl(meth)acrylate, t-butyldiphenylsilyl(meth)acrylate, bis(triisopropylsilyl) maleate, methyl triisopropylsilyl maleate, ethyl triisopropylsilyl maleate, n-butyl triisopropylsilyl maleate, isobutyl triisopropylsilyl maleate, t-butyl triisopropylsilyl maleate, n-pentyl triisopropylsilyl maleate, isopentyl triisopropylsilyl maleate, 2-ethylhexyl triisopropylsilyl maleate, cyclohexyl triisopropylsilyl maleate, bis(triisopropylsilyl) fumarate, methyl triisopropylsilyl fumarate, ethyl triisopropylsilyl fumarate, n-butyl triisopropylsilyl fumarate, isobutyl triisopropylsilyl fumarate, n-pentyl triisopropylsilyl fumarate, isopentyl triisopropylsilyl fumarate, 2-ethylhexyl triisopropylsilyl fumarate, and cyclohexyl triisopropylsilyl fumarate.

From the viewpoint that, in particular, coating film defects are unlikely to occur and an antifouling coating film having excellent water resistance can be produced, preferred are triisopropylsilyl(meth)acrylate, tri-s-butylsilyl(meth)acrylate, t-butyldiphenylsilyl(meth)acrylate, and isopentyl triisopropylsilyl maleate. More preferred are triisopropylsilyl (meth)acrylate and isopentyl triisopropylsilyl maleate. These ethylenically unsaturated monomers (a) are used singly or in combination.

<<Monomer (b)>>

The monomer (b) is an ethylenically unsaturated monomer copolymerizable with the monomer (a). Examples of the monomer (b) include: (meth)acrylic esters such as methyl(meth)acrylate, ethyl(meth)acrylate, n-butyl(meth)acrylate, i-butyl(meth)acrylate, t-butyl(meth)acrylate, 2-ethylhexyl(meth)acrylate, lauryl(meth)acrylate, 2-methoxyethyl acrylate, 2-methoxypropyl acrylate, 4-methoxybutyl acrylate, 2-ethoxyethyl(meth)acrylate, ethylene glycol monomethyl(meth)acrylate, propylene glycol monomethyl(meth)acrylate, 2-hydroxyethyl(meth)acrylate, 2-hydroxypropyl (meth)acrylate, dimethylaminoethyl(meth)acrylate, diethylaminoethyl(meth)acrylate, benzyl(meth)acrylate, phenyl(meth)acrylate and the like; vinyl compounds such as vinyl chloride, vinylidene chloride, (meth)acrylonitrile, vinyl acetate, butyl vinyl ether, lauryl vinyl ether, n-vinyl pyrrolidone and the like; aromatic compounds such as styrene, vinyl toluene, α-methyl styrene and the like; and maleic compounds such as dimethyl maleate, diethyl maleate and the like. Among them, in particular, (meth) acrylic esters are preferred, and methyl(meth)acrylate, ethyl (meth)acrylate, n-butyl(meth)acrylate, i-butyl(meth)acrylate, 2-ethylhexyl(meth)acrylate, and 2-methoxyethyl acrylate are more preferred. Examples of the monomer (b) may be used singly or in combination as a monomer component of the copolymer (A).

The content of the monomer (a) in the mixture is preferably from about 20 to 70% by mass, and more preferably from about 20 to 60% by weight. When the content of the monomer (a) is from about 20 to 70% by weight, the coating film formed using the resultant antifouling coating composition can exhibit stable dissolution property, and can maintain an antifouling effect for a long period of time.

Usually, the copolymer produced using another polymerization initiator has an weight-average molecular weight (Mw) of preferably from 10,000 to 100,000. The copolymer (A) produced using 1,1,3,3-tetramethyl butylperoxy-2-ethyl hexanoate or 1,1,3,3-tetramethyl butylperoxy neodecanoate as a polymerization initiator has an weight-average molecular weight (Mw) can be lower, preferably from 3,000 to 100,000 and more preferably from 3,000 to 70,000. When the Mw is from 3,000 to 100,000, the coating films are not brittle and have a suitable dissolving rate, so that a desired antifouling effect can be effectively exerted. When the copolymer has an weight-average molecular weight (Mw) of from 3,000 to 12,000, the viscosity of the antifouling coating composition can be suitably decreased such that the amount of a solvent used can be effectively reduced at the time of using the composition as a coating material. One example of the method for measuring the Mw is gel permeation chromatography (GPC).

The copolymer A may be any one of a random copolymer, alternate copolymer, periodical copolymer, and block copolymer between the monomer (a) and the monomer (b). The copolymer A, for example, can be produced by polymerizing the monomer (a) and the monomer (b) under the presence of a polymerization initiator 1,1,3,3-tetramethyl butylperoxy-2-ethyl hexanoate or 1,1,3,3-tetramethyl butylperoxy neodecanoate. When such a polymerization initiator is used, terminal of a polymer chain generated has a group represented by chemical formula (2) and/or chemical formula (3).

Examples of polymerization methods include solution polymerization, bulk polymerization, emulsion polymerization, and suspension polymerization. Among them, the solution polymerization is preferable because it allows the copolymer A to be prepared easily and accurately.

In the polymerization reaction, an organic solvent may be added, if necessary. Examples of the organic solvent include: aromatic hydrocarbon-based solvents (e.g., xylene, toluene); aliphatic hydrocarbon-based solvents (e.g., hexane, heptane); ester-based solvents (e.g., ethyl acetate, butyl acetate, isobutyl acetate, methoxypropyl acetate); alcohol-based solvents (e.g., isopropyl alcohol, butyl alcohol); ether-based solvents (e.g., dioxane, diethyl ether, dibutyl ether); and ketone-based solvents (e.g., methyl ethyl ketone, methyl isobutyl ketone). Among these, aromatic hydrocarbon-based solvents are preferable, and xylene is particularly preferable. These solvents may be used singly or in combination.

The reaction temperature in the polymerization reaction is usually from 70 to 140° C. and preferably from 80 to 120° C. The reaction time necessary for the polymerization reaction may be suitably selected depending on the reaction temperature, etc., and is usually from about 4 to 8 hours. The polymerization reaction is preferably conducted under an inert gas (e.g. nitrogen gas, argon gas) atmosphere.

The amount of the copolymer (A) in the composition of the present invention is not particularly limited, and is usually from 2 to 50% by mass and preferably from 4 to 25% by mass with respect to the solid content of the composition of the present invention. When the amount of the copolymer (A) is from 4 to 25% by mass, the suitable dissolving rate and properties of the coating film in seawater can be achieved. In addition, the long-term stable surface renewal can remain constant and a desired antifouling effect can be effectively exerted. Also, the coating film can exert excellent recoating performance.

The antifouling coating composition of the present invention may further contain, as necessary, an antifoulant, a release modifier, a plasticizer, and/or another resin, etc., in addition to the copolymer (A). The addition can improve the antifouling effect.

<Antifoulant>

There is no limitation to the antifoulants as long as they have a killing or repelling effect against aquatic fouling organisms. Examples can include inorganic and organic antifoulants.

Examples of the inorganic antifoulants include cuprous oxide, copper thiocyanate (general name: copper rhodanide), cupronickel, and copper powder. Among them, cuprous oxide and copper rhodanide are particularly preferred.

Examples of the organic antifoulants include: organic copper compounds such as 2-mercaptopyridine-N-oxide copper (general name: copper pyrithione) and the like; organic zinc compounds such as 2-mercaptopyridine-N-oxide zinc (general name: zinc pyrithione), zinc ethylene bis(dithio carbamate) (general name: zineb), zinc bis(dimethyldithiocarbamate)(general name: ziram), dizinc bis(dimethyldithiocarbamate)ethylenebis(dithiocarbamate) (general name: polycarbamate) and the like; organic boron compounds such as pyridine-triphenylborane, 4-isopropyl pyridyl-diphenylmethyl borane, 4-phenyl pyridiyl-diphenyl borane, triphenylboron-n-octadecyl amine, triphenyl[3-(2-ethylhexyloxy) propyl amine]boron and the like; maleimide compounds such as 2,4,6-trichloromaleimide, N-(2,6-diethylphenyl)-2,3-dichloromaleimide and the like; and 4,5-dichloro-2-n-octyl-3-isothiazolone (general name: Sea-Nine 211), 3,4-dichlorophenyl-N-N-dimethylurea (general name: diuron), 2-methylthio-4-t-butylamino-6-cyclopropylamino-s-triazine (general name: Irgarol 1051), 2,4,5,6-tetrachloroisophthalonitrile (general name: chlorothalonil), N-dichlorofluoromethylthio-N',N'-dimethyl-N-p-tolylsulfamide (general name: tolylfluanid), N-dichloromethylthio-N',N'-dimethyl-N-phenylsulfamide (general name: dichlofluanid), 2-(4-thiazolyl)benzimidazole (general name: thiabendazole), 3-(benzo [b]thien-2-yl)-5,6-dihydro-1,4,2-oxathiazine-4-oxide (general name: bethoxazine), 2-(p-chlorophenyl)-3-cyano-4-bromo-5-trifluoromethyl pyrrole (general name: ECONEA 028), etc. Among them, particularly preferred are zinc pyrithione, copper pyrithione, pyridine-triphenylborane, 4-isopropyl pyridyl-diphenylmethyl borane, bethoxazine, zineb, Sea-Nine 211, and Irgarol 1051. More preferred are copper pyrithione, zinc pyrithione, pyridine-triphenylborane, and bethoxazine.

As the antifoulant, preferred are cuprous oxide, copper rhodanide, zinc pyrithione, copper pyrithione, pyridine-triphenylborane, 4-isopropyl pyridyl-diphenylmethyl borane, bethoxazine, zineb, Sea-Nine 211, Irgarol 1051, tolylfluanid, and dichlofluanid. More preferred are cuprous oxide, copper pyrithione, zinc pyrithione, pyridine-triphenylborane, and Sea-Nine 211.

These antifoulants may be used singly or in combination.

The amount of the antifoulant in the composition of the present invention is not particularly limited, and is usually from 0.1 to 75% by mass, and preferably from 1 to 60% by mass with respect to the solid content of the composition of the present invention. When the amount of the antifoulant is less than 0.1% by mass, a sufficient antifouling effect might not be obtained. When the amount of the antifoulant is over 75% by mass, the obtained coating film is fragile, and adherence of the coating film to the coated object is weak, and thus the coating film does not sufficiently exhibit the function as an antifouling coating film.

<Release Modifier>

Examples of the release modifier include rosin, a rosin derivative and a metal salt thereof, monocarboxylic acid and a salt thereof, and an alicyclic hydrocarbon resin.

Examples of the rosin includes tall oil rosin, gum rosin, and wood rosin. Examples of the rosin derivative include hydrogenated rosin, disproportionated rosin, maleinized rosin, formylated rosin, and polymerized rosin. A reaction product of a metal compound with rosin can be used as a metal salt of the rosin or a metal salt of the rosin derivative. Examples of the metal salt of rosin include a zinc (or copper) salt of gum rosin, a zinc (or copper) salt of wood rosin, and a zinc (or copper) salt of tall oil rosin. Examples of the metal salt of the rosin derivative include a zinc (or copper) salt of hydrogenated rosin, a zinc (or copper) salt of disproportionated rosin, a zinc (or copper) salt of maleinized rosin, a zinc (or copper) salt of formylated rosin, and a zinc (or copper) salt of polymerized rosin.

Examples of the monocarboxylic acid include $C_{5-30}$ fatty acid, synthetic fatty acid, and naphthenic acid. Examples of a salt of the monocarboxylic acid include copper salts, zinc salts, magnesium salts, and calcium salts.

Examples of the commercially available alicyclic hydrocarbon resin include Quintone 1500, 1525L, and 1700 (product name; manufactured by ZEON CORPORATION).

In view of giving the composition of the present invention a suitably facilitated elution property, the composition preferably contains at least one member selected from the group consisting of rosin, a rosin derivative, and a metal salt thereof as the release modifier. In view of improving crack resistance and water resistance, the composition more preferably contains a copper or zinc salt of rosin or a copper or zinc salt of a rosin derivative.

The amount of the release modifier in the composition of the present invention is usually from 1 to 400 parts by mass and preferably from 5 to 350 parts by mass with respect to 100 parts by mass of the copolymer (A). When the release modifier is less than 1 part by mass, the effect of preventing attachment of aquatic fouling organisms, in particular, during rigging cannot be expected.

<Plasticizer>

By adding the plasticizer to the antifouling coating composition of the present invention, it is possible to improve the plasticity of the composition, and as a result it is possible to suitably form a strong coating film.

Examples of the plasticizer include: phosphate esters such as tricresyl phosphate, trioctylphosphate, triphenyl phosphate and the like; phthalate esters such as dibutyl phthalate, dioctyl phthalate and the like; adipate esters such as dibutyl adipate, dioctyl adipate and the like; sebacate esters such as dibutyl sebacate, dioctyl sebacate and the like; epoxidized oils and fats such as epoxidized soybean oil, epoxidized linseed oil and the like; alkyl vinyl ether polymers such as a methyl vinyl ether polymer, an ethyl vinyl ether polymer and the like; polyalkylene glycols such as polyethylene glycol, polypropylene glycol and the like; and t-nonylpentasulfide, vaseline, polybutene, tris(2-ethyl hexyl)trimellitate, silicone oil, liquid paraffin, and chlorinated paraffin. These plasticizers may be used singly or in combination.

The amount of the plasticizer in the composition of the present invention is usually from 0.1 to 100 parts by mass and preferably from 0.5 to 90 parts by mass with respect to 100 parts by mass of the copolymer (A).

<Another Resin>

Another resin is added to the antifouling coating composition of the present invention. This makes it possible to reduce cost without impairing the effects of the present invention. Also, a synergistic effect with the resin properties can be obtained.

Examples of another resin include a (meth)acrylic resin, an alkyd resin, a polyester resin, a chlorinated rubber resin, and a vinyl resin.

Another resin can be added to the composition of the present invention to such a degree that the suitable dissolving rate and properties of the coating film in seawater are not impaired. Its amount is from 1 to 300 parts by mass and preferably from 10 to 250 parts by mass with respect to 100 parts by mass of the copolymer (A).

<Other Additives>

Furthermore, the antifouling coating composition of the present invention, if necessary, may include a pigment, a dye, an antifoaming agent, an anti-sagging agent, a dispersant, an antisettling agent, a dehydrating agent, and/or an organic solvent to such a degree that the suitable dissolving rate and properties of the coating film in seawater are not impaired.

Example of the pigment include zinc oxide, red iron oxide, talc, titanium oxide, silica, calcium carbonate, barium sulfate, calcium oxide, and magnesium oxide. They can be used singly or in combination.

Examples of the dye include various kinds of organic dyes soluble in an organic solvent.

Examples of the antifoaming agent include a silicone resin-based antifoaming agent and an acryl resin-based antifoaming agent.

Examples of the anti-sagging agent, the dispersant or the antisettling agent include fatty acid amide wax and oxidized polyethylene.

Examples of the dehydrating agent include a synthetic zeolite-based adsorbent, orthoesters, silicates such as tetraethoxysilane, and isocyanates. They can be used singly or in combination.

Examples of the organic solvent include solvents such as an aliphatic solvent, an aromatic solvent, a ketone-based solvent, an ester-based solvent, and an ether-based solvent which are usually used in the antifouling coating material. They can be used singly or in combination.

<Method for Producing Antifouling Coating Composition>

The antifouling coating composition of the invention can be manufactured, for example, by mixing and dispersing a mixed solution containing the copolymer (A) and, for example, an antifoulant, a release modifier, a plasticizer and/or another resin by use of a disperser.

The mixed solution is preferably obtained by dissolving or dispersing various materials (e.g., the copolymer (A) and an antifoulant, a release modifier, a plasticizer and/or another resin) in a solvent. As the solvent, those identical or similar to the above organic solvent may be used.

As the disperser, for example, the one which can be used as a micro-pulverizer can be suitably used. For example, a commercially available homo mixer, sand mill, bead mill, or the like can be used. Furthermore, the mixed solution may be mixed and dispersed by use of a stirrer-equipped container containing glass beads for mixing and dispersing.

<Antifouling Treatment, Antifouling Coating Film, and Coated Object>

The antifouling treatment of the invention is characterized in that an antifouling coating film is formed using the above-explained antifouling coating composition on the surface of an object that is subjected to coating. The antifouling treatment of the present invention can prevent adhesion of aquatic fouling organisms by the gradual dissolution of the surface of the antifouling coating film such that the surface of the coating film is continually renewed. After the dissolution of the coating film, the antifouling effect can be continuously exhibited by recoating the composition.

Examples of objects on which a coating film can be formed include ships (in particular, ship bottoms), fishing tools, and structures submerged in seawater. Examples of the fishing tools include fishing nets for use in aquaculture or in fixed netting, and fishing net accessories such as ropes and floats attached to fishing nets. Examples of the structures submerged in seawater include power plant aqueducts, bridges, and port facilities.

The antifouling coating film can be formed by applying the antifouling coating composition onto the surface (entirely or partially) of an object on which the coating film is to be formed.

Examples of the coating method include brush coating, spray coating, dipping, flow coating, and spin coating. These coating methods may be employed singly or in combination.

The coating composition is dried after the application. The drying temperature may be room temperature. The drying time may be suitably selected depending on the thickness of the coating film, etc.

The antifouling coating film produced using the above antifouling coating composition according to an embodiment of the present invention can exhibit the suitable dissolving rate and properties of the coating film in seawater. In addition, the long-term stable surface renewal can remain constant and a desired antifouling effect can be effectively exerted. Also, the coating film can advantageously exert excellent recoating performance.

The thickness of the antifouling coating film may be suitably selected depending on types of an object on which the coating film is to be formed, the navigation speed of a ship, the seawater temperature, etc. For example, when the object on which a coating film is formed is a ship bottom, the thickness of the antifouling coating film is usually from 50 to 500 µm, and preferably from 100 to 400 µm.

The antifouling coating film of the present invention has a suitable hardness. Specifically, the antifouling coating film of the present invention has a hardness enough to cause no coating film defects such as cold flow.

The coated object of the present invention has the antifouling coating film on its surface. The coated object of the present invention may have the antifouling coating film on the entire surface thereof or on the partial surface thereof.

The coated object of the present invention is provided with a coating film having long-term stable surface renewal and excellent recoating performance because the suitable dissolving rate and properties of the coating film in seawater are improved. Accordingly, the coated object can be preferably applied for the above ships (in particular, ship bottoms), fishing tools, structures submerged in seawater, etc. For example, when the antifouling coating film is formed on the surface of a ship bottom, the antifouling coating film gradually dissolves from the surface, so that the coating film surface is always renewed. This prevents the adhesion of aquatic fouling organisms. Furthermore, the hydrolysis rate of the antifouling coating film is desirably controlled. Hence, ships benefit from the antifouling effect for a long period of time. Additionally, even when the ships are not moving, for example, during anchorage, rigging, etc., the adhesion and accumulation of aquatic fouling organisms are barely observed and the antifouling effect is exhibited for a long time.

In addition, the surface of the antifouling coating film is basically free from cracking or peeling even after a long period of time. Accordingly, it is unnecessary to completely remove the existing coating film before re-forming a new coating film. Thus, by directly recoating the antifouling coating film composition, the antifouling coating film can be effectively formed. This makes it possible to continuously maintain the antifouling effect in a simple and inexpensive manner.

EXAMPLES

The following illustrates Examples, etc., and further clarifies characteristics of the present invention. The present invention, however, is not limited to these Examples.

In each of Production Examples, Comparative Production Examples, Examples, and Comparative Examples, "%" denotes "% by mass". The viscosity was determined at 25°

C. using a Brookfield viscometer. The weight-average molecular weight (Mw) was determined by gel permeation chromatography (GPC) (using a polystyrene standard). GPC was performed under the following conditions.

Equipment: HLC-8220 GPC; Tosoh Corporation

Guard column: TSK guard column Super HZ-L (manufactured by Tosoh Corporation)

Column: TSK-gel Super HZM-M 4.6 mm I.D. 15 cm (manufactured by Tosoh Corporation); two serially connected columns Flow rate: 0.35 mL/min Detector: RI Column thermostat temperature: 40° C.

Developing solvent: THF (a special grade chemical; manufactured by Wako Pure Chemical Industries, Ltd.)

Sample concentration: 10 g/L

Input amount: 3 μL

The viscosity was determined with a Brookfield rotary viscometer at 25° C. in accordance with JIS7117-1.

The non-volatile content was determined by heating for 1 hour at 125° C.

The amounts of each component shown in Tables are represented in grams.

<Production of Copolymer Solution>

Production Example 1

Production of Copolymer Solution A-1

First, 170 g of xylene was charged to a stainless-steel reaction tank equipped with a thermometer, a cooler, a stirrer, and a dropping funnel. Next, a mixture of 270 g of triisopropylsilyl methacrylate, 50 g of methyl methacrylate, 130 g of 2-methoxyethyl methacrylate, 30 g of 2-methoxyethyl acrylate, 20 g of n-butyl acrylate, and 2 g of 1,1,3,3-tetramethyl butylperoxy-2-ethyl hexanoate (initially added) was added dropwise into the reaction tank over a period of 2 hour, while nitrogen gas was injected and the mixture was stirred at 85±5° C. Then, after the resulting reaction solution was stirred at the above temperature for 1 hour, 1 g of 1,1,3,3-tetramethyl butylperoxy-2-ethyl hexanoate (subsequently added) was added three times with 1-hour intervals to complete the polymerization reaction. After that, 330 g of xylene was added and dissolved to produce the copolymer solution A-1.

Table 1 shows the viscosity, non-volatile content, Mw, and glass-transition temperature of A-1.

Production Examples 2 to 22 and Comparative Production Examples 1 to 11

Production of Copolymer Solutions A-2 to A-22 and B-1 to B-11

Polymerization reactions were performed in accordance with the same procedure as in Production Example 1, using the monomers, polymerization initiators, and solvents shown in Tables 1 to 3. The copolymer solutions A-2 to A-22 and B-1 to B-11 were thus obtained. Tables 1 to 3 show the viscosity, non-volatile content, Mw, and glass-transition temperature of each of these copolymer solutions.

When 1,1,3,3-tetramethyl butylperoxy-2-ethyl hexanoate or 1,1,3,3-tetramethyl butylperoxy neodecanoate among the polymerization initiators shown in Tables 1 to 3 was used, terminal of the polymer chain has a group represented by chemical formula (2) and/or a group represented by chemical formula (3). However, when a polymerization initiator other than the above is used, terminal of the polymer chain has a group having another structure. This difference in terminal structure seems to cause a difference in the evaluation results regarding Test Examples 2 to 4.

Terminal of each of the copolymers obtained in Production Examples 1 to 22 was determined by measuring a spectrum with respect to the $^{13}$C-single pulse with $^{1}$H decoupling and a $^{13}$C-DEPT135 spectrum.

NMR analysis was performed under the following conditions.

Device: ECX400; JEOL RESONANCE Inc.

Probe: ROYAL probe

Flip angle: 30 degrees

Pulse waiting time: 20 sec

The number of integrations: 10000 times

Figure 2:
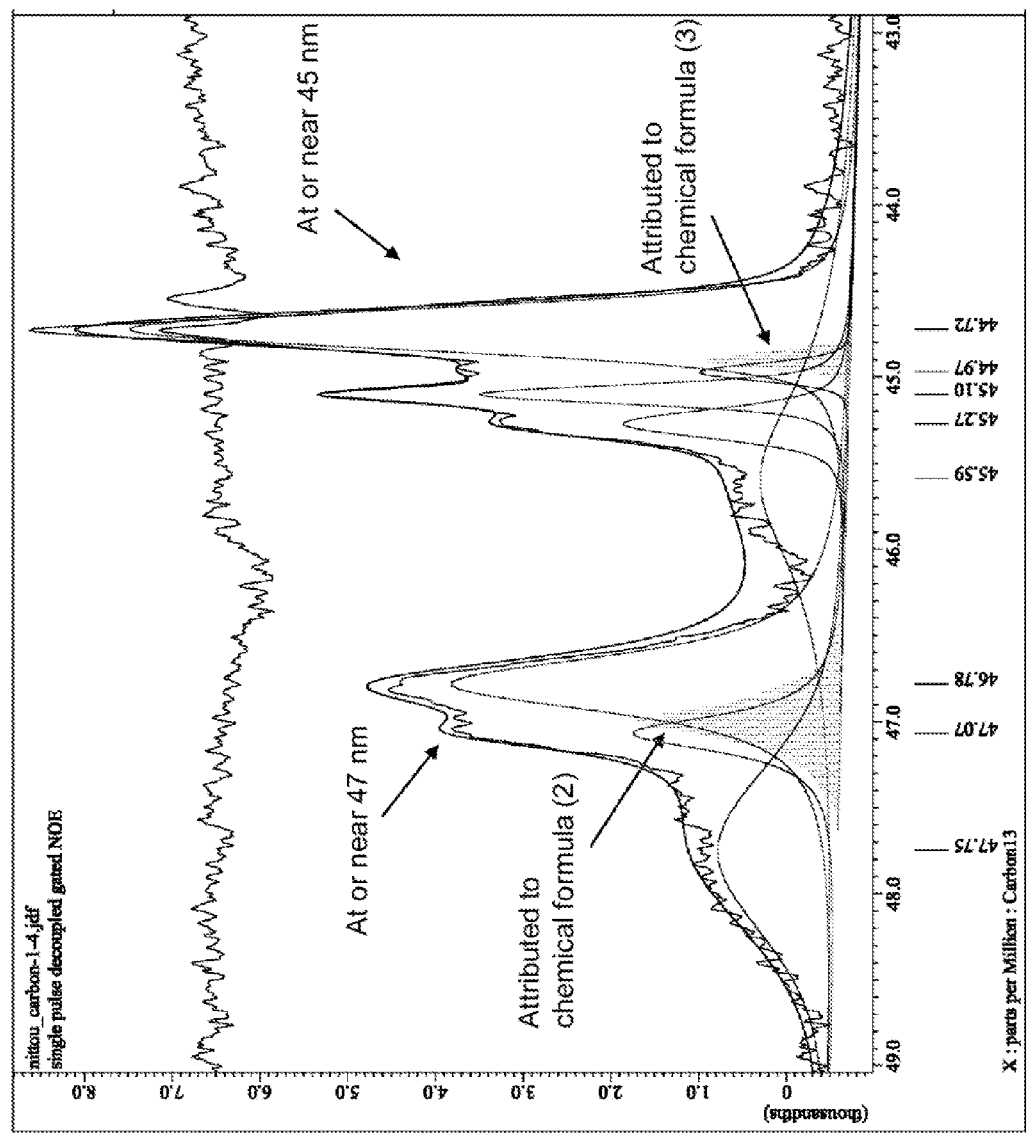
FIG. 2 is a magnified view of the spectrum region between 43 and 49 nm in FIGS. 1(a) to (b).

FIGS. 1(a) and (b) each show an NMR spectrum obtained with regard to the copolymer of Production Example 1. FIG. 1(a) shows a spectrum with respect to the "$^{13}$C-DEPT135". FIG. 1(b) shows a spectrum with respect to the "$^{13}$C-Single pulse with $^{1}$H decoupling". Comparison between FIGS. 1(a) and 1(b) revealed that a group of signals between 44 ppm and 49 ppm was attributed to a quaternary carbon. In addition, the obtained spectrum was analyzed using the "Prediction" function of ACD software (i.e., NMR analysis software marketed by FUJITSU Inc.). As shown in FIG. 2, the peaks at or near 47 ppm and the peaks at or near 45 ppm each included a plurality of peaks. The peak at 47.07 ppm was found to be attributed to chemical formula (2). The peak at 44.97 ppm was found to be attributed to chemical formula (3). Note that it is postulated that the peaks attributed to neither chemical formula (2) nor (3) are attributed to a quaternary carbon present in the main chain of the copolymer. The NMR spectrum of each of the copolymers of Production Examples 2 to 22 was analyzed under the same conditions. The analysis likewise demonstrated the peaks attributed to chemical formulae (2) and (3).

TABLE 1

(Copolymers)

| Component Classification | Component Name | Production Example |  |  |  |  |  |  |  |  |  |  |
|---|---|---|---|---|---|---|---|---|---|---|---|---|
| | | 1 | 2 | 3 | 4 | 5 | 6 | 7 | 8 | 9 | 10 | 11 |
| Initial Solvent in Flask | Xylene | 170 | 170 | 170 | 400 | 400 | 170 | 170 | 170 | 400 | 400 | |
| | n-Butyl acetate | | | | | | | | | | | 300 |
| Monomer (a) | Triisopropylsilyl methacrylate | 270 | 270 | 270 | 324 | 324 | 300 | 300 | 300 | 360 | 360 | |
| | Triisopropylsilyl acrylate | | | | | | | | | | | |
| | Isopentyl triisopropylsilyl maleate | | | | | | | | | | | 240 |
| Ethylenically Unsaturated Monomer (b) | Methyl methacrylate | 50 | 60 | | | | | | | | | |
| | i-Butyl methacrylate | | | | | | | | | | | |
| | 2-Methoxyethyl methacrylate | 130 | 130 | 130 | | | 130 | 130 | 130 | 156 | 156 | |
| | n-Butyl acrylate | 20 | 20 | 20 | | | 20 | 20 | 20 | 24 | 24 | |
| | 2-Methoxyethyl acrylate | 30 | 30 | 30 | 156 | 156 | 20 | 20 | 20 | 24 | 24 | |
| | Isobornyl acrylate | | | 60 | 24 | 24 | 30 | 30 | 30 | 36 | 36 | |
| | Dimethyl maleate | | | | 36 | 36 | | | 20 | | | 150 |
| | Vinyl acetate | | | | | | | | | | | 110 |
| | VeoVa 9 | | | | | | | | | | | 100 |
| Polymerization Initiator | Initially Added 1,1,3,3-tetramethyl butyl peroxy-2-ethyl hexanoate | 2 | 5 | 6 | 35 | 26 | 1.5 | 4 | 4 | 30 | 20 | 60 |
| | Subsequently Added (3 times) 1,1,3,3-tetramethyl butyl peroxy-2-ethyl hexanoate | 1 | 1 | 1 | 1 | 1 | 1 | 1 | 1 | 1 | 1 | 1 |
| Chain Transfer Agent | 1-Dodecanethiol | | | | | 5 | | | | | 5 | |
| Added After Reaction was Terminated | Xylene | 330 | 330 | 330 | | | 330 | 330 | 330 | | | |
| | n-Butyl acetate | | | | | | | | | | | |
| Reaction Temperature (° C. ± 6° C.) | | 85 | 85 | 85 | 85 | 85 | 85 | 85 | 85 | 85 | 85 | 35 |
| Physical Properties of Copolymer | Viscosity (mPa·s/25° C.) | 820 | 360 | 375 | 186 | 185 | 710 | 290 | 296 | 165 | 166 | 85 |
| | Non-volatile Content (%, 125° C., 1 hour) | 50.3 | 60.6 | 60.3 | 62.0 | 61.9 | 60.1 | 50.5 | 50.2 | 61.7 | 61.3 | 115 |
| | Weight-average Molecular Weight (Mw) | 86,000 | 49,500 | 51,300 | 9,500 | 10,400 | 88,000 | 49,000 | 60,600 | 9,700 | 9,900 | 60.7 |
| | Glass Transition Temperature (Tg, ° C.) | 48 | 48 | 47 | 48 | 48 | 38 | 38 | 39 | 38 | 38 | 4,000 |
| | Copolymer Name | A-1 | A-2 | A-3 | A-4 | A-6 | A-6 | A-7 | A-8 | A-9 | A-10 | 30 |
| Test Example 1 Repeated Production Test | The number of batches in which gel material was generated | Zero | Zero | Zero | Zero | Zero | Zero | Zero | Zero | Zero | Zero | A-11 |
| Test Example 2 Water Resistance Test | After 3 months | A | A | A | A | A | A | A | A | A | A | Zero |
| | After 6 months | A | A | A | A | A | A | A | A | A | A | A |
| | | | | | | | | | | | | A |

TABLE 2

(Copolymers)

| Component Classification | Component Name | Production Example | | | | | | | | | | |
|---|---|---|---|---|---|---|---|---|---|---|---|---|
| | | 12 | 13 | 14 | 15 | 16 | 17 | 18 | 19 | 20 | 21 | 22 |
| Initial Solvent in Flask | Xylene | 170 | 170 | 170 | 400 | 400 | 170 | 170 | 170 | 400 | 400 | 300 |
| | n-Butyl acetate | 270 | 270 | 270 | 324 | 324 | 300 | 300 | 300 | 360 | 360 | 240 |
| Monomer (a) | Triisopropylsilyl methacrylate | | | | | | | | | | | |
| | Triisopropylsilyl acrylate | | | | | | | | | | | |
| | Isopentyl triisopropylsilyl maleate | | | | | | | | | | | |
| Ethylenically Unsaturated Monomer (b) | Methyl methacrylate | 60 | 50 | | 60 | 60 | 130 | 130 | 130 | 156 | 156 | 160 |
| | i-Butyl methacrylate | | | | | | 20 | 20 | | 24 | 24 | 110 |
| | 2-Methoxyethyl methacrylate | 130 | 130 | 130 | 156 | 156 | | | | | | 100 |
| | n-Butyl acrylate | 20 | 20 | 20 | 24 | 24 | 20 | 20 | 20 | 24 | 24 | |
| | 2-Methoxyethyl acrylate | 30 | 30 | 30 | 36 | 36 | 30 | 30 | 30 | 36 | 36 | |
| | Isobornyl acrylate | | | 50 | | | | | | | | |
| | Dimethyl maleate | | | | | | | | | | | |
| | Vinyl acetate | | | | | | | | | | | |
| | VeoVa 9 | | | | | | | | | | | 70 |
| Polymerization Initiator | 1,1,3,3-tetramethyl butyl peroxy neodecanoate | 2 | 6 | 6 | 40 | 30 | 2 | 4.5 | 4.5 | 36 | 25 | 1 |
| | Initially Added | | | | | | | | | | | |
| | 1,1,3,3-tetramethyl butyl peroxy neodecanoate | 1 | 1 | 1 | 1 | 1 | 1 | 1 | 1 | 1 | 1 | |
| | Subsequently Added (3 times) | | | | | | | | | | | |
| Chain Transfer Agent | 1-Dodecanethiol | | | | | 5 | | | | | 5 | |
| Added After Reaction was Terminated | Xylene | 330 | 330 | 330 | | | 330 | 330 | 330 | | | |
| | n-Butyl acetate | | | | | | | | | | | |
| Reaction Temperature (° C. ± 5° C.) | | 65 | 65 | 65 | 65 | 65 | 65 | 66 | 65 | 65 | 65 | 65 |
| Physical Properties of Copolymer | Viscosity (mPa · s/25° C.) | 880 | 395 | 350 | 186 | 180 | 700 | 300 | 290 | 165 | 160 | 115 |
| | Non-volatile Content (%, 125° C., 1 hour) | 50.1 | 60.9 | 50.7 | 60.8 | 60.7 | 49.9 | 50.3 | 49.9 | 61.2 | 60.9 | 90.1 |
| | Weight-average Molecular Weight (Mw) | 90,500 | 52,200 | 49,400 | 10,200 | 9,600 | 89,500 | 51,200 | 50,300 | 10,100 | 9,800 | 4,800 |
| | Glass Transition Temperature (Tg, ° C.) | 48 | 48 | 47 | 48 | 48 | 38 | 38 | 39 | 38 | 38 | 30 |
| | Copolymer Name | A-12 | A-13 | A-14 | A-15 | A-16 | A-17 | A-18 | A-19 | A-20 | A-21 | A-22 |
| Test Example 1 Repeated Production Test | The number of batches in which gel material was generated | Zero | Zero | Zero | Zero | Zero | Zero | Zero | Zero | Zero | Zero | Zero |
| Test Example 2 Water Resistance Test | After 3 months | A | A | A | A | A | A | A | A | A | A | A |
| | After 6 months | A | A | A | A | A | A | A | A | A | A | A |

TABLE 3

(Copolymers)

| Component Classification | Component Name | Comparative Production Example | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Initial Solvent in Flask | Xylene | 400 | 400 | 400 | 370 | 400 | 400 | 400 | 400 | 370 | 400 | 300 |
| | n-Butyl acetate | 324 | 324 | 324 | 324 | 324 | | | | | | |
| Monomer (a) | Triisopropylsilyl methacrylate | | | | | | 360 | 360 | 360 | 360 | 360 | |
| | Triisopropylsilyl acrylate | | | | | | | | | | | 240 |
| | Isopentyl triisopropylsilyl maleate | | | | | | | | | | | |
| Ethylenically Unsaturated Monomer (b) | Methyl methacrylate | 60 | 60 | 60 | 60 | 60 | | | | | | |
| | i-Butyl methacrylate | | | | | | | | | | | |
| | 2-Methoxyethyl methacrylate | 156 | 156 | 156 | 156 | 156 | 156 | 156 | 156 | 156 | 156 | |
| | n-Butyl acrylate | 24 | 24 | 24 | 24 | 24 | 24 | 24 | 24 | 24 | 24 | |
| | 2-Methoxyethyl acrylate | 36 | 36 | 36 | 36 | 36 | 36 | 36 | 36 | 36 | 36 | |
| | Dimethyl maleate | | | | | | | | | | | 150 |
| | Vinyl acetate | | | | | | | | | | | 110 |
| | Veova 9 | | | | | | | | | | | 100 |
| Polymerization Initiator Initially Added | t-Butylperoxy-2-ethyl hexanoate | 46 | | | | | | | | | | 50 |
| | Azobisisobutyronitrile | | 40 | | | | 40 | | | | | |
| | t-Hexylperoxy-2-ethyl hexonate | | | 33 | | | | 30 | | | | |
| | Nyper-BMT-K4o | | | | 65 | | | | | | | |
| | t-Amylperoxy-2-ethyl hexonate | | | | | 32 | | | 30 | | | |
| Subsequently Added (3 times) | t-Butylperoxy-2-ethyl hexanoate | 1 | | | | | | | | | | 1 |
| | Azobisisobutyronitrile | | 1 | | | | 1 | | | | | |
| | t-Hexylperoxy-2-ethyl hexonate | | | 1 | | | | 1 | | 65 | | |
| | Nyper-BMT-K40 | | | | 1 | | | | | | 30 | |
| | t-Amylperoxy-2-ethyl hexonate | | | | | 1 | | | 1 | 1 | 1 | |
| Added After Reaction Was Terminated | n-Butyl acetate | 85 | 85 | 86 | 106 | 85 | 85 | 85 | 86 | 106 | 85 | 35 |
| | Reaction Temperature (° C. ± 5° C.) | 180 | 176 | 180 | 185 | 170 | 170 | 160 | 165 | 165 | 165 | 105 |
| Physical Properties of Copolymer | Viscosity (mPa · s/25° C.) | 60.0 | 61.9 | 60.9 | 61.6 | 61.6 | 60.1 | 60.8 | 61.4 | 61.7 | 61.3 | 116 |
| | Non-volatile Content (%, 125° C., 1 hour) | | | | | | | | | | | 60.4 |
| | Weight-average Molecular Weight (Mw) | 11,000 | 10,300 | 9,700 | 11,200 | 10,100 | 11,600 | 10,800 | 10,000 | 11,300 | 10,200 | 4,200 |
| | Glass Transition Temperature (Tg, ° C.) | 48 | 48 | 48 | 48 | 48 | 38 | 38 | 38 | 38 | 38 | 38 |
| | Copolymer Name | B-1 | B-2 | B-3 | B-4 | B-5 | B-6 | B-7 | B-8 | B-9 | B-10 | B-11 |
| Test Example 1 Repeated Production Test | The Number of batches in which gel material was generated | 14 | 16 | 21 | 19 | 17 | 26 | 25 | 22 | 29 | 23 | 13 |
| Test Example 2 | After 3 months | B | B | B | B | B | B | B | B | B | B | C |
| Water Resistance Test | After 6 months | D | D | D | D | D | D | D | D | D | D | D |

Product name "VeoVa 9": $C_9$ vinyl ester (manufactured by Momentive Inc.)

Product name "Nyper BMT-K40": a mixture of di-(2-methyl benzoyl)peroxide, benzoyl(3-methyl benzoyl)peroxide, and dibenzoyl peroxide (manufactured by NOF CORPORATION)

Note that the stabilizers shown in Table 4 were added to various monomers shown in Tables 1 to 3 and the resulting mixtures were used.

TABLE 4

(Stabilizer)

| Monomer | Stabilizer | Content |
|---|---|---|
| Triisopropylsilyl methacrylate | Hydroquinone monomethyl ether | 100 ppm |
| Triisopropylsilyl acrylate | Hydroquinone monomethyl ether | 100 ppm |
| Methyl methacrylate | Hydroquinone monomethyl ether | 3 ppm |
| i-Butyl methacrylate | Hydroquinone monomethyl ether | 25 ppm |
| 2-Methoxyethyl methacrylate | Hydroquinone monomethyl ether | 100 ppm |
| n-Butyl acrylate | Hydroquinone monomethyl ether | 15 ppm |
| 2-Methoxyethyl acrylate | Hydroquinone monomethyl ether | 100 ppm |
| Isobornyl acrylate | Hydroquinone monomethyl ether | 100 ppm |
| Vinyl acetate | Hydroquinone monomethyl ether | 5 ppm |
| VeoVa 9 | Hydroquinone monomethyl ether | 5 ppm |

Test Example 1

Repeated Production Test

Batch production of each of the copolymer solutions A-1 to A-22 as obtained in Production Examples 1 to 22 was repeated 300 times. Gel materials were visually unrecognizable on the inner wall of the reaction tank, etc.

Production of each of the copolymer solutions B-1 to B-11 as obtained in Comparative Production Examples 1 to 11 was repeated. Gel materials were observed on the inner wall of the reaction tank, etc. Tables 1 to 3 show the number of batches in which gel materials were observed.

This demonstrates that the production according to the method of the present invention does not result in generation of gel materials even if the production is repeated.

Example 2

Water Resistance Test

Each of the copolymers (A-1 to A-22 and B-1 to B-11) as obtained in Production Examples 1 to 22 and Comparative Production Examples 1 to 11 was applied onto a surface of a obscure glass (100×200×2 mm) to form a dry film with a thickness of about 100 μm. The applied coating was dried for 3 days at 50° C., such that a test piece having the dry film with a thickness of about 100 μm was prepared. The test piece was immersed in natural seawater at 35° C. for 6 months. Then, the condition of the coating film was visually inspected.

A: the coating film undergoes no change. B: the coating film becomes cloudy. C: the coating film becomes white. D: the coating film is swelled.

The results are shown in Tables 1 to 3.

It can be seen from Tables 1 to 3 that the dry films formed using the copolymers (A-1 to A-22) as obtained in Production Examples 1 to 22 of the invention have excellent resistance to water.

<Production of Coating Compositions>

Examples 1 to 22 and Comparative Examples 1 to 11

Production of Coating Compositions

Components listed in Tables 5 to 7 were blended in the proportions (% by mass) shown in Tables 5 to 7, and were mixed and dispersed together with glass beads with a diameter of 1.5 to 2.5 mm to produce coating compositions.

Solution containing a zinc salt of gum rosin: one prepared in Production Example 23 was used.

Solution containing a zinc salt of hydrogenated rosin: one prepared in Production Example 24 was used.

Solution containing gum rosin: a xylene solution containing, as a solid content, about 60% of gum rosin (WW) made in China.

Solution containing hydrogenated rosin: a xylene solution containing, as a solids content, about 60% of "Highpale CH"(product name).

Epoxidized soybean oil: product name "Sansocizer E-2000H"(manufactured by New Japan Chemical Co., Ltd.).

Chlorinated paraffin: product name "TOYOPARAX 150" (manufactured by Tosoh Corporation).

Acrylic polymer: product name "UP-1000"(with a viscosity: 1,000 mPa·s, Mw: 3,000, Tg: −77° C., and solid content: ≥98%) (manufactured by TOAGOSEI CO., LTD.).

Styrene-acrylic polymer: product name "UF-5022" (flakes; with a Mw: 14,000, Tg: 75° C., and solid content: ≥96%) (manufactured by TOAGOSEI CO., LTD.).

Cuprous oxide: product name "NC-301", with an average particle size of 3 μm (manufactured by Nissin Chemco, Ltd.)

Copper pyrithione: product name "copper Omadine" (manufactured by Arch Chemicals, Inc.).

4,5-Dichloro-2-n-octyl-4-isothiazoline-3-one: product name "Sea-Nine 211 "(Rohm & Haas, Inc.) with a solid content of 30% by weight.

Red iron oxide: product name "TODA COLOR EP-13D" (manufactured by Toda Pigment Corp.).

Talc: product name "Crown Talc 3S"(manufactured by MATSUMURA INDUSTRIES Co., Ltd.).

Zinc oxide: product name "Zinc Oxide Type II"(manufactured by Seido Chemical Industry Co., Ltd.).

Titanium oxide: product name "FR-41"(manufactured by FURUKAWA CO., LTD.).

Tetraethoxysilane: a special grade chemical, manufactured by Kishida Chemical Co., Ltd.

Fatty acid amide-based thixotropic agent: product name "Dispalon A603-20X"(manufactured by Kusumoto Chemicals, Ltd.).

Production Example 23

Production of Xylene Solution Containing Zinc Salt of Gum Rosin

First, 240 g of gum rosin (WW) made in China and 240 g of xylene were added to a 1-L flask equipped with a thermometer, a reflux condenser, and a stirrer, and 120 g of zinc oxide was further added thereto such that all of the resin acids in the gum rosin formed zinc salts. Then, the mixture was dehydrated under reflux at 70 to 80° C. for 3 hours. After that, the mixture was cooled and filtered to obtain the xylene solution containing a zinc salt of gum rosin (a transparent dark brown solution; the solid content: about 60%). The resulting xylene solution had a non-volatile content of 60.5%.

Production Example 24

Production of Xylene Solution Containing Zinc Salt of Hydrogenated Rosin

First, 240 g of Highpale CH (hydrogenated rosin) and 240 g of xylene were added to a 1-L flask equipped with a thermometer, a reflux condenser, and a stirrer, and 120 g of zinc oxide was further added thereto such that all of the resin acids in the hydrogenated rosin formed zinc salts. Then, the mixture was dehydrated under reflux at 70 to 80° C. for 3 hours. After that, the mixture was cooled and filtered to obtain the xylene solution containing a zinc salt of hydrogenated rosin (a transparent dark brown solution; the solid content: about 60%). The resulting xylene solution had a non-volatile content of 60.6%.

TABLE 5

(Production of Coating Compositions)

| | | Example | | | | | | | | | | |
|---|---|---|---|---|---|---|---|---|---|---|---|---|
| | Component Name | 1 | 2 | 3 | 4 | 5 | 6 | 7 | 8 | 9 | 10 | 11 |
| Copolymer | A-1 | 28 | | | | | | | | | | |
| | A-2 | | 14 | | | | | | | | | |
| | A-3 | | | 14 | | | | | | | | |
| | A-4 | | | | 13 | | | | | | | |
| | A-5 | | | | | 13 | | | | | | |
| | A-6 | | | | | | 28 | | | | | |
| | A-7 | | | | | | | 14 | | | | |
| | A-8 | | | | | | | | 14 | | | |
| | A-9 | | | | | | | | | 13 | | |
| | A-10 | | | | | | | | | | 13 | |
| | A-11 | | | | | | | | | | | 10 |
| Release Modifier | Solution containing a zinc salt of gum resin | 1.0 | 5.0 | 5.0 | 6.5 | 6.5 | 1.0 | 5.0 | 5.0 | 6.5 | 6.5 | 7.5 |
| | Solution containing a zinc salt of hydrogenated resin | 1.0 | 5.0 | 5.0 | 6.5 | 6.5 | 1.0 | 5.0 | 5.0 | 6.5 | 6.5 | 7.5 |
| | Solution containing gum resin | | | 3.0 | | | | | 3.0 | | | |
| | Solution containing hydrogenated resin | | 3.0 | | | | | 3.0 | | | | |
| Plasticizer | Epoxidized soybean oil | 1.0 | 1.0 | 1.0 | 1.0 | 1.0 | 1.0 | 1.0 | 1.0 | 1.0 | 1.0 | 1.0 |
| | Chlorinated paraffin | 1.0 | 2.0 | 2.0 | 2.0 | 2.0 | 1.0 | 2.0 | 2.0 | 2.0 | 2.0 | 2.0 |
| Another Resin | Acrylic polymer UP-1000 | 1.0 | 1.0 | 1.0 | 1.0 | 1.0 | 1.0 | 1.0 | 1.0 | 1.0 | 1.0 | 1.0 |
| | Styrene-acrylic polymer UF-5022 | 1.0 | 1.0 | 1.0 | 1.0 | 1.0 | 1.0 | 1.0 | 1.0 | 1.0 | 1.0 | 1.0 |
| Antifoulant | Cuprous oxide NC-301 | 45 | 36 | 36 | 43 | 43 | 45 | 36 | 36 | 43 | 43 | 44 |
| | Copper pyrithione | 1.5 | 2.0 | 2.0 | 2.0 | 2.0 | 1.5 | 2.0 | 2.0 | 2.0 | 2.0 | 1.5 |
| | 4,5-Dichloro-2-n-octyl-isothiazoline-3-one (solid content: 30%) | 4.0 | | 5.0 | | | 4.0 | | 5.0 | | | 5.0 |
| Pigment | Red iron oxide | 2.0 | 4.0 | 3.0 | 3.0 | 3.0 | 2.0 | 4.0 | 3.0 | 3.0 | 3.0 | 2.0 |
| | Talc | 3.0 | 9.0 | 8.0 | 7.0 | 7.0 | 3.0 | 9.0 | 8.0 | 7.0 | 7.0 | 7.0 |
| | Zinc oxide | 3.0 | 5.0 | 5.0 | 6.0 | 6.0 | 3.0 | 5.0 | 5.0 | 6.0 | 6.0 | 4.0 |
| | Titanium oxide | 1.0 | 1.0 | 1.0 | 1.0 | 1.0 | 1.0 | 1.0 | 1.0 | 1.0 | 1.0 | 1.0 |
| Other Additives | Tetraethoxysilane (water binder) | 0.5 | 1.0 | 1.0 | 0.5 | 0.5 | 0.5 | 1.0 | 1.0 | 0.5 | 0.5 | 0.5 |
| | Fatty acid amide-based thixotropic agent Dispalon A603-20X | 3.0 | 2.0 | 2.0 | 1.0 | 1.0 | 3.0 | 2.0 | 2.0 | 1.0 | 1.0 | 2.0 |
| Solvent | Xylene | 3.0 | 8.0 | 5.0 | 5.5 | 5.5 | 3.0 | 8 | 5.0 | 5.5 | 5.5 | 3.0 |
| | Total | 100 | 100 | 100 | 100 | 100 | 100 | 100 | 100 | 100 | 100 | 100 |
| Test Example 3 Rotary Test | Average dissolving amount of a coating film during the first 12 months (μm/month) | 2.1 | 3.5 | 3.0 | 3.7 | 3.5 | 2.3 | 3.3 | 3.2 | 3.6 | 3.4 | 2.0 |
| | Average dissolving amount of a coating film between 12 and 24 months (μm/month) | 2.4 | 3.6 | 3.5 | 3.8 | 3.8 | 2.8 | 4.0 | 3.8 | 4.1 | 4.2 | 2.1 |
| | Coating film conditions after 24 months | A | A | A | A | A | A | A | A | A | A | A |
| Test Example 4 Antifouling Test | After 6 months | A | A | A | A | A | A | A | A | A | A | A |
| | After 12 months | A | A | A | A | A | A | A | A | A | A | A |
| | After 24 months | B | A | A | A | A | B | A | A | A | A | B |

TABLE 6

(Production of Coating Compositions)

| | | Example | | | | | | | | | | |
|---|---|---|---|---|---|---|---|---|---|---|---|---|
| | Component Name | 12 | 13 | 14 | 15 | 16 | 17 | 18 | 19 | 20 | 21 | 22 |
| Copolymer | A-12 | 28 | | | | | | | | | | |
| | A-13 | | 14 | | | | | | | | | |
| | A-14 | | | 14 | | | | | | | | |
| | A-15 | | | | 13 | | | | | | | |
| | A-16 | | | | | 13 | | | | | | |
| | A-17 | | | | | | 28 | | | | | |
| | A-18 | | | | | | | 14 | | | | |
| | A-19 | | | | | | | | 14 | | | |
| | A-20 | | | | | | | | | 13 | | |
| | A-21 | | | | | | | | | | 13 | |
| | A-22 | | | | | | | | | | | 10 |
| Release Modifier | Solution containing a zinc salt of gum resin | 1.0 | 5.0 | 5.0 | 6.5 | 6.5 | 1.0 | 5.0 | 5.0 | 6.5 | 6.5 | 7.5 |
| | Solution containing a zinc salt of hydrogenated resin | 1.0 | 5.0 | 5.0 | 6.5 | 6.5 | 1.0 | 5.0 | 5.0 | 6.5 | 6.5 | 7.5 |
| | Solution containing gum resin | | | 3.0 | | | | | 3.0 | | | |
| | Solution containing hydrogenated resin | | 3.0 | | | | | 3.0 | | | | |
| Plasticizer | Epoxidized soybean oil | 1.0 | 1.0 | 1.0 | 1.0 | 1.0 | 1.0 | 1.0 | 1.0 | 1.0 | 1.0 | 1.0 |
| | Chlorinated paraffin | 1.0 | 2.0 | 2.0 | 2.0 | 2.0 | 2.0 | 2.0 | 2.0 | 2.0 | 2.0 | 2.0 |
| Another Resin | Acrylic polymer UP-1000 | 1.0 | 1.0 | 1.0 | 1.0 | 1.0 | 1.0 | 1.0 | 1.0 | 1.0 | 1.0 | 1.0 |
| | Styrene-acrylic polymer UF-5022 | 1.0 | 1.0 | 1.0 | 1.0 | 1.0 | 1.0 | 1.0 | 1.0 | 1.0 | 1.0 | 1.0 |
| Antifoulant | Cuprous oxide NC-301 | 45 | 36 | 36 | 43 | 43 | 45 | 36 | 36 | 43 | 43 | 44 |
| | Copper pyrithione | 1.5 | 2.0 | 2.0 | 2.0 | 2.0 | 1.5 | 2.0 | 2.0 | 2.0 | 2.0 | 1.5 |
| | 4,5-Dichloro-2-n-octyl-isothiazoline-3-one (solid content: 30%) | 4.0 | | 5.0 | | | 4.0 | | 5.0 | | | 5.0 |
| Pigment | Red iron oxide | 2.0 | 4.0 | 3.0 | 3.0 | 3.0 | 2.0 | 4.0 | 3.0 | 3.0 | 3.0 | 2.0 |
| | Talc | 3.0 | 9.0 | 8.0 | 7.0 | 7.0 | 3.0 | 9.0 | 8.0 | 7.0 | 7.0 | 7.0 |
| | Zinc oxide | 3.0 | 5.0 | 5.0 | 6.0 | 6.0 | 3.0 | 5.0 | 5.0 | 6.0 | 6.0 | 4.0 |
| | Titanium oxide | 1.0 | 1.0 | 1.0 | 1.0 | 1.0 | 1.0 | 1.0 | 1.0 | 1.0 | 1.0 | 1.0 |
| Other Additives | Tetraethoxysilane (water binder) | 0.5 | 1.0 | 1.0 | 0.5 | 0.5 | 0.5 | 1.0 | 1.0 | 0.5 | 0.5 | 0.5 |
| | Fatty acid amide-based thixotropic agent Dispalon A603-20X | 3.0 | 2.0 | 2.0 | 1.0 | 1.0 | 3.0 | 2.0 | 2.0 | 1.0 | 1.0 | 2.0 |
| Solvent | Xylene | 3.0 | 8.0 | 5.0 | 5.5 | 5.5 | 3.0 | 8 | 5.0 | 5.5 | 5.5 | 3.0 |
| | Total | 100 | 100 | 100 | 100 | 100 | 100 | 100 | 100 | 100 | 100 | 100 |
| Test Example 3 Rotary Test | Average dissolving amount of a coating film during the first 12 months (μm/month) | 2.2 | 3.5 | 2.9 | 3.6 | 3.7 | 2.4 | 3.3 | 3.1 | 3.5 | 3.3 | 2.1 |
| | Average dissolving amount of a coating film between 12 and 24 months (μm/month) | 2.3 | 3.7 | 3.5 | 3.7 | 3.9 | 3.0 | 3.9 | 3.6 | 3.9 | 3.8 | 2.1 |
| | Coating film conditions after 24 months | A | A | A | A | A | A | A | A | A | A | A |
| Test Example 4 Antifouling Test | After 6 months | A | A | A | A | A | A | A | A | A | A | A |
| | After 12 months | A | A | A | A | A | A | A | A | A | A | A |
| | After 24 months | B | A | A | A | A | B | A | A | A | A | B |

TABLE 7

(Production of Coating Compositions)

| | | Comparative Example | | | | | | | | | | |
|---|---|---|---|---|---|---|---|---|---|---|---|---|
| | Component Name | 1 | 2 | 3 | 4 | 5 | 6 | 7 | 8 | 9 | 10 | 11 |
| Copolymer | B-1 | 13 | | | | | | | | | | |
| | B-2 | | 13 | | | | | | | | | |
| | B-3 | | | 13 | | | | | | | | |
| | B-4 | | | | 13 | | | | | | | |
| | B-5 | | | | | 13 | | | | | | |
| | B-6 | | | | | | 13 | | | | | |
| | B-7 | | | | | | | 13 | | | | |
| | B-8 | | | | | | | | 13 | | | |
| | B-9 | | | | | | | | | 13 | | |
| | B-10 | | | | | | | | | | 13 | |
| | B-11 | | | | | | | | | | | 10 |

TABLE 7-continued (Production of Coating Compositions)

|  | Component Name | Comparative Example | | | | | | | | | | |
| --- | --- | --- | --- | --- | --- | --- | --- | --- | --- | --- | --- | --- |
|  |  | 1 | 2 | 3 | 4 | 5 | 6 | 7 | 8 | 9 | 10 | 11 |
| Release Modifier | Solution containing a zinc salt of gum resin | 6.5 | 6.5 | 6.5 | 6.5 | 6.5 | 6.5 | 6.5 | 6.5 | 6.5 | 6.5 | 7.5 |
|  | Solution containing a zinc salt of hydrogenated resin | 6.5 | 6.5 | 6.5 | 6.5 | 6.5 | 6.5 | 6.5 | 6.5 | 6.5 | 6.5 | 7.5 |
| Plasticizer | Epoxidized soybean oil | 1.0 | 1.0 | 1.0 | 1.0 | 1.0 | 1.0 | 1.0 | 1.0 | 1.0 | 1.0 | 1.0 |
|  | Chlorinated paraffin | 2.0 | 2.0 | 2.0 | 2.0 | 2.0 | 2.0 | 2.0 | 2.0 | 2.0 | 2.0 | 2.0 |
| Another Resin | Acrylic polymer UP-1000 | 1.0 | 1.0 | 1.0 | 1.0 | 1.0 | 1.0 | 1.0 | 1.0 | 1.0 | 1.0 | 1.0 |
|  | Styrene-acrylic polymer UF-5022 | 1.0 | 1.0 | 1.0 | 1.0 | 1.0 | 1.0 | 1.0 | 1.0 | 1.0 | 1.0 | 1.0 |
| Antifoulant | Cuprous oxide NC-301 | 43 | 43 | 43 | 43 | 43 | 43 | 43 | 43 | 43 | 43 | 44 |
|  | Copper pyrithione | 2.0 | 2.0 | 2.0 | 2.0 | 2.0 | 2.0 | 2.0 | 2.0 | 2.0 | 2.0 | 1.5 |
|  | 4,5-Dichloro-2-n-octyl-isothiazoline-3-one (solid content: 30%) |  |  |  |  |  |  |  |  |  |  | 5.0 |
| Pigment | Red iron oxide | 3.0 | 3.0 | 3.0 | 3.0 | 3.0 | 3.0 | 3.0 | 3.0 | 3.0 | 3.0 | 2.0 |
|  | Talc | 7.0 | 7.0 | 7.0 | 7.0 | 7.0 | 7.0 | 7.0 | 7.0 | 7.0 | 7.0 | 7.0 |
|  | Zinc oxide | 6.0 | 6.0 | 6.0 | 6 | 6.0 | 6.0 | 6.0 | 6.0 | 6.0 | 6.0 | 4.0 |
|  | Titanium oxide | 1.0 | 1.0 | 1.0 | 1.0 | 1.0 | 1.0 | 1.0 | 1.0 | 1.0 | 1.0 | 1.0 |
| Other Additives | Tetraethoxysilane (water binder) | 0.5 | 0.5 | 0.5 | 0.5 | 0.5 | 0.5 | 0.5 | 0.5 | 0.5 | 0.5 | 0.5 |
|  | Fatty acid amide-based thixotropic agent Dispalon A603-20X | 1.0 | 1.0 | 1.0 | 1.0 | 1.0 | 1.0 | 1.0 | 1.0 | 1.0 | 1.0 | 2.0 |
| Solvent | Xylene | 5.5 | 5.5 | 5.5 | 5.5 | 5.5 | 5.5 | 5.5 | 5.5 | 5.5 | 5.5 | 3.0 |
|  | Total | 100 | 100 | 100 | 100 | 100 | 100 | 100 | 100 | 100 | 100 | 100 |
| Test Example 3 Rotary Test | Average dissolving amount of a coating film during the first 12 months (μm/month) | 3.5 | 3.5 | 3.7 | 3.6 | 3.4 | 3.3 | 3.5 | 3.6 | 3.4 | 3.4 | 1.6 |
|  | Average dissolving amount of a coating film between 12 and 24 months (μm/month) | 4.1 | 4.0 | 4.0 | 3.9 | 3.8 | 5.0 | 4.7 | 4.7 | 4.8 | 4.5 | 1.5 |
|  | Coating film conditions after 24 months | D | D | D | D | D | D | D | D | D | D | D |
| Test Example 4 Antifouling Test | After 6 months | A | A | A | A | A | A | A | A | A | A | A |
|  | After 12 months | B | B | B | B | B | B | B | B | B | B | C |
|  | After 24 months | D | D | D | D | D | D | D | D | D | D | D |

Test Example 3

Rotary Test

A tank was provided, in the center thereof, with a rotating drum having a diameter of 515 mm and a height of 440 mm to allow the rotation of the drum by means of a motor. The tank was also provided with a cooling apparatus for keeping the temperature of seawater constant, and an automatic pH controller for keeping the pH of the seawater constant.

Two test plates were prepared for each coating composition in accordance with the following method.

First, an anti-corrosive coating film was formed by applying an anti-corrosive coating material (an epoxy vinyl-based A/C) onto a titanium plate (71×100×0.5 mm) such that the thickness after drying would be about 100 μm, followed by drying. Each of the antifouling coating compositions obtained in Examples 1 to 22 and Comparative Examples 1 to 11 was applied onto the anti-corrosive coating film so that the thickness after drying would be about 300 μm. The applied coating was dried for 3 days at 40° C., such that the test plate having the dry coating film with a thickness of about 300 μm was prepared.

One of the thus-prepared test plates was secured to the rotating drum of the rotary apparatus of the above-mentioned equipment and was made to contact the seawater, and the rotating drum was rotated at a speed of 20 knots. During the test, the seawater temperature was maintained at 25° C. and the pH at 8.0 to 8.2; the seawater was replaced once every week.

The initial thickness of the coating film and the remaining thickness of the coating film as measured every 3 months from the beginning of the test were determined using a laser focus displacement meter for each test plate, and the thickness of the dissolved coating film was calculated from the difference therebetween to give the dissolving amount of the coating film per month (μm/month). The measurement was conducted for 24 months, and the dissolving amount of the coating film was calculated every 12 months.

After the rotary test was completed (after 24 months), the test plate was dried, and the surface of each coating film was visually inspected to evaluate the state of the coating film.

The state was evaluated as follows.

A: No defects are observed.
B: Hairline cracks are slightly observed.
C: Hairline cracks are observed on the entire surface of the coating film.
D: Coating film defects such as large cracks, blisters or peel-offs are observed.

The results are shown in Tables 5 to 7. It can be seen from Tables 5 to 7 that the coating films formed using the coating compositions of the invention (Examples 1 to 22) are dissolved in seawater in an amount of about 2 to 5 μm per month (annual average). Furthermore, the coating films formed using the coating compositions of the invention are excellent in water resistance, and do not develop cracks or hairline cracks. In this way, the antifouling effect can be maintained for a long time. The coating films formed using the coating compositions of Examples 4 to 5, 9 to 11, 15 to 16 and 20 to 22 develop neither cracks nor hairline cracks although the low-molecular-weight copolymers are used.

In contrast, the coating films formed using the coating compositions of Comparative Examples 1 to 11 develop coating film defects such as cracks or peel-offs after a long period has passed because the low-molecular-weight copolymers are used. That is, the above coating films cannot exhibit the antifouling effect for a long period.

Test Example 4

Antifouling Test

Each of the coating compositions obtained in Examples 1 to 22 and Comparative Examples 1 to 11 was applied onto both surfaces of a hard vinyl chloride plate (100×200×2 mm) such that the thickness of a dry coating film would be about 200 μm. The applied coating was dried for 3 days at room temperature (25° C.), such that the test plate having the dry coating film with a thickness of about 200 μm was prepared. This test plate was immersed at 1.5 m below sea level in Owase City, Mie Prefecture, Japan, and the test plate fouling due to attached objects was examined for 12 months.

The state of the surface of the coating film was visually evaluated in accordance with criteria shown below.

A: Fouling organisms such as shellfish or algae do not attach, and slime hardly attaches.

B: Fouling organisms such as shellfish or algae do not attach, and slime thinly attaches (to the extent that the coating film surface is observable) and the slime can be removed when wiped softly with a brush.

C: Fouling organisms such as shellfish or algae do not attached, but slime thickly attaches (to the extent that the coating film surface is not observable) and the slime cannot be removed even when wiped strongly with a brush.

D: Fouling organisms such as shellfish or algae do attach.

The results are shown in Tables 5 to 7. It can be seen from Tables 5 to 7 that fouling organisms such as shellfish or algae do not attach and slime hardly attaches to the coating films formed using the coating compositions of the invention (Examples 1 to 22).

In contrast, fouling organisms such as shellfish, algae, and/or slime do attach, after 12-month immersion, to the coating films formed using the coating compositions of Comparative Examples 1 to 11.

The invention claimed is:

1. A copolymer for an antifouling coating composition, comprising a copolymer (A) having, on a side chain, a group represented by chemical formula (1) and having, on terminal, at least one of a group represented by chemical formula (2) and a group represented by chemical formula (3), wherein
chemical formula (1) is

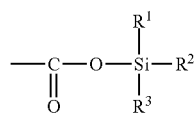
(1)

(wherein $R^1$, $R^2$, and $R^3$ are the same or different from each other and each represents a $C_{3-6}$ alkyl group branched at an α-position or a phenyl group);
chemical formula (2) is

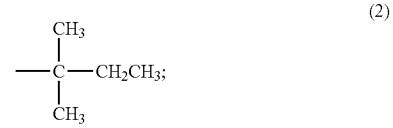
(2)

and
chemical formula (3) is

(3)

2. The copolymer for an antifouling coating composition according to claim 1, wherein the copolymer (A) has, on terminal, both of the group represented by chemical formula (2) and the group represented by chemical formula (3).

3. The copolymer for an antifouling coating composition according to claim 1, wherein the copolymer (A) is produced by polymerizing an ethylenically unsaturated monomer (a) having the group represented by chemical formula (1) and an ethylenically unsaturated monomer (b) copolymerizable with the monomer (a) under the presence of a polymerization initiator 1,1,3,3-tetramethyl butylperoxy-2-ethyl hexanoate or 1,1,3,3-tetramethyl butylperoxy neodecanoate.

4. An antifouling coating composition comprising the copolymer therefor according to claim 1.

5. The antifouling coating composition according to claim 4, further comprising a release modifier.

6. A method for producing a copolymer for an antifouling coating composition, comprising the step of: polymerizing an ethylenically unsaturated monomer (a) having a group represented by chemical formula (1) and an ethylenically unsaturated monomer (b) copolymerizable with the monomer (a) under the presence of a polymerization initiator 1,1,3,3-tetramethyl butylperoxy-2-ethyl hexanoate or 1,1,3,3-tetramethyl butylperoxy neodecanoate, wherein
chemical formula (1) is

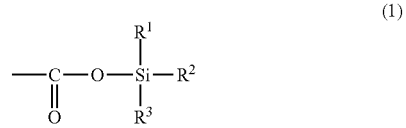
(1)

(wherein $R^1$, $R^2$, and $R^3$ are the same or different from each other and each represents a $C_{3-6}$ alkyl group branched at an α-position or a phenyl group).

7. A coated object having, on a surface thereof, an antifouling coating film formed using the antifouling coating composition according to claim 4.

* * * * *